US012809952B2

(12) United States Patent
Hawes et al.

(10) Patent No.: US 12,809,952 B2
(45) Date of Patent: Nov. 24, 2026

(54) SECURING LARGE LANGUAGE MODEL OUTPUT BY PROPAGATING PERMISSIONS

(71) Applicant: Palantir Technologies Inc., Denver, CO (US)

(72) Inventors: Matthew Hawes, Denver, CO (US); Ankit Shankar, San Francisco, CA (US); Morten Telling, Copenhagen (DK); Jack Dobson, New York, NY (US); Adil Majid, New York, NY (US)

(73) Assignee: Palantir Technologies Inc., Aventura, FL (US)

( * ) Notice: Subject to any disclaimer, the term of this patent is extended or adjusted under 35 U.S.C. 154(b) by 19 days.

(21) Appl. No.: 18/675,587

(22) Filed: May 28, 2024

(65) Prior Publication Data

US 2024/0403396 A1 Dec. 5, 2024

Related U.S. Application Data

(60) Provisional application No. 63/519,782, filed on Aug. 15, 2023, provisional application No. 63/505,302, filed on May 31, 2023.

(51) Int. Cl.
*G06F 21/31* (2013.01)
*G06F 16/903* (2019.01)

(52) U.S. Cl.
CPC ........ *G06F 21/31* (2013.01); *G06F 16/90335* (2019.01)

(58) Field of Classification Search
None
See application file for complete search history.

(56) References Cited

U.S. PATENT DOCUMENTS 10,838,758 B2 11/2020 Lee et al.
11,531,846 B1 * 12/2022 Bodapati ................ G06N 20/00
(Continued)

FOREIGN PATENT DOCUMENTS

EP 4471641 12/2024

OTHER PUBLICATIONS

Reddit, ReLLM: Solving our internal need for permission sensitive context for LLM's, r/MachineLearning, https://www.reddit.com/r/MachineLearning/comments/12qxzjd/p_rellm_solving_our_internal_need_for_permission/?rdt=49107, printed May 29, 2024, in 5 pages.
(Continued)

*Primary Examiner* — Jeffrey R Swearingen
(74) *Attorney, Agent, or Firm* — Knobbe, Martens, Olson & Bear, LLP

(57) ABSTRACT

Computer-implemented systems and methods are disclosed, including for determining permissions for nondeterministic model output. A computer-implemented method may include, for example, receiving one or more user inputs including a first user input providing at least a portion of a first prompt for a query for a first nondeterministic model. A computer-implemented method may in response to receiving the one or more user inputs include: executing the query, by the first nondeterministic model, to generate an output, determining a first one or more data inputs used by the first nondeterministic model during execution of the query, determining a first set of permissions associated with the first one or more data inputs; and applying a second set of permissions to at least a first portion of the output based on the first set of permissions.

20 Claims, 5 Drawing Sheets

(56) References Cited

U.S. PATENT DOCUMENTS

| | | | | |
|---|---|---|---|---|
| 12,380,361 | B2 * | 8/2025 | Chhibber | G06Q 30/0609 |
| 2014/0119531 | A1 * | 5/2014 | Tuchman | H04M 7/003<br>379/265.09 |
| 2018/0352005 | A1 | 12/2018 | Gaddam et al. | |
| 2021/0133577 | A1 | 5/2021 | Srinivasan et al. | |
| 2022/0222361 | A1 | 7/2022 | Mann et al. | |
| 2023/0045713 | A1 * | 2/2023 | Wohlstadter | G06F 3/0482 |
| 2023/0124288 | A1 * | 4/2023 | Meier-Hellstern | G06N 3/0455<br>706/12 |
| 2023/0385085 | A1 | 11/2023 | Singh | |
| 2024/0244060 | A1 * | 7/2024 | Garg | H04L 63/104 |
| 2024/0395246 | A1 * | 11/2024 | Mcquinn | G06N 3/084 |

OTHER PUBLICATIONS

"What is ReLLM?", Introduction, https://docs.rellm.ai/, printed on Jun. 10, 2024, in 3 pages.
Duall et al., "Complex QA & language models hybrid architectures, Survey", Arxiv.org, Cornell University Libarary, Ithaca, NY, XP091442492, Section 8.4:31 (2023).
Official Communication for European Patent Application No. 24179284.5 dated Oct. 2, 2024, 8 pages.

* cited by examiner

SECURING LARGE LANGUAGE MODEL OUTPUT BY PROPAGATING PERMISSIONS

CROSS-REFERENCE TO RELATED APPLICATIONS

This application claims benefit of U.S. Provisional Patent Application No. 63/505,302, filed May 31, 2023, and titled "SECURING LLM OUTPUT WITH USER-BASED SECURITY MARKINGS," and U.S. Provisional Patent Application No. 63/519,782, filed Aug. 15, 2023, and titled "SECURING LARGE LANGUAGE MODEL OUTPUT BY PROPAGATING PERMISSIONS." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Implementations of the present disclosure relate to systems and techniques for securing outputs of large language models. More specifically, implementations of the present disclosure relate to computerized systems and techniques for propagation of data permissions to outputs of large language models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data permissioning (also referred to as data access control or data authorization) is an important aspect of data security and privacy management. Data permissioning can involve controlling and regulating access to sensitive data within an organization or system, ensuring that only authorized individuals or entities can access, modify, or use specific data. Large language models can be useful in a wide range of applications, particularly for natural language processing tasks.

SUMMARY

The systems, methods, and devices described herein each have several aspects, no single one of which is solely responsible for its desirable attributes. Without limiting the scope of this disclosure, several non-limiting features will now be described briefly.

Nondeterministic models, such as large language models ("LLMs"), have become important tools in managing the complexities of modern enterprises. However, nondeterministic models can be difficult to secure due to the opaque nature of how nondeterministic models access and process information. For example, a nondeterministic model may use different data and processes to perform two queries with identical prompts. Further, it may not be clear from the output of a nondeterministic model if any information in the output is secure or derived from secure information or any of the input information. As needs for nondeterministic models evolve, the lack of security may inhibit the use of nondeterministic models from desirable applications.

The present disclosure includes a system, methods, and software (among other disclosed features) for securing nondeterministic model output (generally referred to herein as "the system") for use with other types of functions. The present disclosure further includes various processes, functionality, and interactive graphical user interfaces related to the system. According to various implementations, the system (and related processes, functionality, and interactive graphical user interfaces), can advantageously provide for the securing of nondeterministic model outputs by, for example, determining and/or propagating permissions information to such outputs. The system may operate to apply permissions to nondeterministic model outputs during runtime operation of nondeterministic models. While any nondeterministic model may be used by the system, for convenience, the various processes, functionality, and interactive graphical user interfaces related to the system may be described respective to operation with LLMs. The system can, for example, advantageously enable users to chain LLMs together with other types of functions, such as, for example, specialized functions, machine learning models, optimization models, data lakes/sources of truth (such as an ontology of data objects), and/or the like.

The system can be used to manage access to data objects, data tools, data sets, databases and/or other computer resources (generally referred to herein as "data inputs") for use with nondeterministic models. The data inputs can have sets of rules, such as permissions, constraints, qualifications, authorizations, security markings, access controls, and the like (generally referred to herein as "permissions") that govern the access to each data input. Each required permission may be indicated by one or more permission indicia associated with a data input. In order to access a data input, the permissions associated with the data input must be satisfied by access credentials. Access credentials may be associated with and/or used by a user, the system, or a nondeterministic model to gain access to one or more data inputs.

Determining a permission to apply to the output of a nondeterministic models can be difficult due to the opaque nature of how nondeterministic models access and process information. For example, a nondeterministic model may use different data and processes to perform two queries with identical prompts. Advantageously, the system may operate to apply permissions to nondeterministic model outputs during runtime operation of nondeterministic models by determining during runtime operations what data inputs a nondeterministic model accesses. The system can then apply all, or a portion of the permissions to a nondeterministic model output that are associated with each data input a nondeterministic model access during runtime. Advantageously, the system allows for two queries with identical prompts to result in output with two different permissions applied based on different sets of data inputs used for each of the two queries.

Determining during runtime operation what data inputs a nondeterministic model accesses can be difficult. For instance, it can be difficult to predict and/or determine which data inputs a nondeterministic model may use based on the prompt given to the nondeterministic model. For example, a nondeterministic model that is given identical prompts multiple times and allowed to access an identical set of data inputs for each prompt may access different subsets of the set of data inputs for each query of the prompt. Advantageously, the system can determine, during the runtime of a query, which data inputs are accessed or otherwise used for the query.

In some implementations, the system can determine the data inputs used for queries by providing a nondeterministic model a set of data inputs that can be used by the nondeterministic model for each query. For example, the system may determine that for a specific query, a nondeterministic model can access a specific set of data inputs. In this example, the system may only provide the specific set of data inputs to the nondeterministic model.

The system may determine the scope of a set of data inputs to be provided to a nondeterministic model based, at least in part, on the access credentials of a user providing a prompt for a nondeterministic model. For example, the user may not have the access credentials to access certain data inputs. In this example, the system may determine the access credentials of the user providing the prompt and provide the nondeterministic model a set of data inputs that excludes the data inputs the user does not have access credentials for.

The system may determine the scope of a set of data inputs to be provided to a nondeterministic model based, at least in part, on one or more user inputs indicating a reduced level of access credentials or permissions for a query. For example, a user may want a subset of the data input the user has access credentials to access to be excluded from the query. In this example, the user may indicate to the system that the subset should be excluded, and the system may provide the nondeterministic model a set of data inputs that does not include the subset. In this way, the system may run a nondeterministic model using a reduced set of data input from the set of data input a user has access credentials to access.

The system may determine the scope of a set of data inputs to be provided to a nondeterministic model based, at least in part, on a prompt for a query. For example, the system may determine one or more user inputs are to be used based on the prompt and provide the nondeterministic model a set of data inputs that includes the determined one or more user inputs.

The system may determine the scope of a set of data inputs to be provided to a nondeterministic model based, at least in part, on permissions, or otherwise flagged data, indicating one or more data inputs for the query contain confidential information. For example, the set of data inputs may exclude any data inputs that contain confidential or restricted information. In some implementations, the set of data inputs will exclude the entire data input that contains the confidential or restricted information. In some implementations, the set of data inputs will exclude only the confidential or restricted information (e.g., individual data cells, data ranges, data columns, individual functions, etc.).

The system may determine the scope of a set of data inputs to be provided to a nondeterministic model based, at least in part, from an input received from the nondeterministic model. For example, the nondeterministic model may determine one or more data inputs for a query based on the prompt for the query, the access credentials of the user providing the prompt for the query, and/or user input providing the access credentials or permissions associated with the query. In this example, the nondeterministic model may request access from the system to, or otherwise indicate, one or more data inputs to use for the query. The system may provide the nondeterministic model a set of data inputs that includes the requested data inputs.

The system may apply permissions to the output of a nondeterministic model by first determining the permissions required by the scope of a set of data inputs passed to the nondeterministic model. The permissions required by the scope of a set of data inputs can include every permission associated with the set of data inputs. A system may execute and query and apply the determined permissions required by the set of data inputs to the output of the nondeterministic model. In some implementations, a system may only apply a subset of the determined permissions required by the set of data inputs to the output of the nondeterministic model. For example, the system may present a user (e.g., the user providing a prompt for the nondeterministic model) with the set of permissions that is to be applied to the output of the nondeterministic model and receive input from the user removing one or more permissions. In this example, the set of data inputs may have included data inputs with specific confidential information (e.g., personal information), but the user may determine that the specific confidential information is not presented by the output of the nondeterministic model (e.g., the personal information was removed). As such, the user may determine that the output need not include the data permissions required to access the specific confidential information. In another example, the system may present a user with the set of permissions is to be applied to the output of the nondeterministic model and receive input from the user confirming the set permissions or indicating that additional permissions are to be added to the set of permissions. The system may alter the set of permissions based on user input. For example, by adding one or more permissions to the set of permissions.

Each data input used by a nondeterministic model may have different permissions. The permissions for data inputs may be related. For example, two data inputs may share a common set of permissions, "Permission A" and "Permission B" alone, or in combination with other permissions. Data inputs with related permissions may have relative levels of stringency. For example, a first data input may be associated with "Permission A" and "Permission B," while a second data input may be associated with "Permission A," "Permission B," and "Permission C." In this example, the second data input has a stricter level of permission relative to the first data input. The permissions for data inputs may have not commonality. For example, a third data input may be associated with "Permission D" while a fourth data input is associated with "Permission E."

In some implementations, the system determines the permissions to apply to the output of a nondeterministic model by determining the most stringent combination of the permissions associated with the data input. For example, the system may determine to apply every permission associated with the data inputs to the output of the nondeterministic model. In some implementations, the system determines the permissions to apply to the output of a nondeterministic model by determining a reduced combination of the permissions associated with the data input. For example, the system may determine to apply a portion of the permissions associated with the data inputs based on user input, indication from a nondeterministic model, or other rule in the system.

The system, or a user of the system, may alter the permission of the output of a nondeterministic model by parsing the output of the nondeterministic model and redacting (e.g., removing or obscuring) portions of the output. For example, the output of a nondeterministic model may have permissions applied associated with personal confidential information. In this example, the system may redact the personal confidential information and remove the associated permissions from the output of the nondeterministic model. In some implementations, the output of the nondeterministic model may have a split permission that allows those with the access credentials for the redacted material to access the unredacted output of the nondeterministic model. In some implementations, the system can determine the output of a nondeterministic model is accessed without the required access credentials and redact or remove a portion of the output.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, models and model-related data, and may enable a user to more quickly and accurately access, navigate, assess, and digest the model-related data than previous systems.

Further, the interactive and dynamic user interfaces described herein are enabled by innovations in efficient interactions between the user interfaces and underlying systems and components. For example, disclosed herein are improved methods of receiving user inputs (including user inputs adding, changing, and/or applying permissions, entering descriptions of tasks, entering prompts, indicating a reduced level of access credential or permissions for a query, selecting data inputs, altering a set of data inputs for a query, redacting or removing portions of the output of a nondeterministic model, etc.), translation and delivery of those inputs to various system components, automatic and dynamic execution of complex processes in response to the input delivery, automatic interaction among various components and processes of the system, and automatic and dynamic updating of the user interfaces (to, for example, display the model-related and/or permissions-related data). The interactions and presentation of data via the interactive user interfaces described herein may accordingly provide cognitive and ergonomic efficiencies, among various additional technical advantages over previous systems.

Thus, various implementations of the present disclosure can provide improvements to various technologies and technological fields, and practical applications of various technological features and advancements. For example, as described above, existing computer-based model evaluation technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Further, the implementation of the various implementations of the present disclosure via computer technology enables many of the advantages described herein, including more efficient management of various types of electronic data (including computer-based models and electronic data used in the evaluation of computer-based models).

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
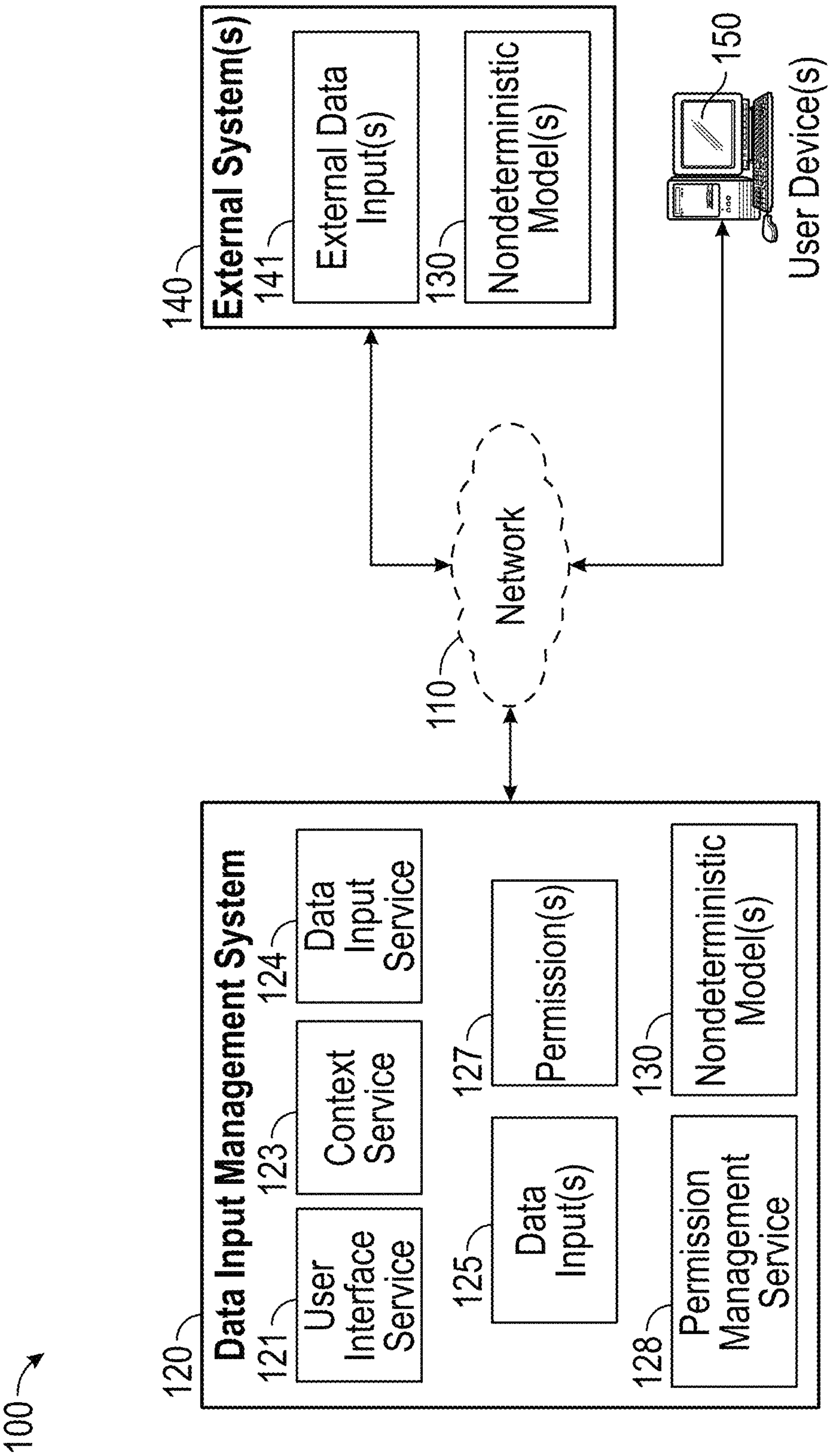
FIG. 1 is a schematic block diagram of an example data input management system in an example computing environment.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

I. Overview

As noted above, nondeterministic models, such as large language models ("LLMs"), have become important tools in managing the complexities of modern enterprises. However, nondeterministic models can be difficult to secure due to the opaque nature of how nondeterministic models access and process information. For example, a nondeterministic model may use different data and processes to perform two queries with identical prompts. Further, it may not be clear from the output of a nondeterministic model if any information in the output is secure or derived from secure information or any of the input information. As needs for nondeterministic models evolve, the lack of security may inhibit the use of nondeterministic models from desirable applications.

The present disclosure includes a system, methods, and software (among other disclosed features) for securing nondeterministic model output (generally referred to herein as "the system") for use with other types of functions. The present disclosure further includes various processes, functionality, and interactive graphical user interfaces related to the system. According to various implementations, the system (and related processes, functionality, and interactive graphical user interfaces), can advantageously provide for the securing of nondeterministic model outputs by, for example, determining and/or propagating permissions information to such outputs. The system may operate to apply permissions to nondeterministic model outputs during runtime operation of nondeterministic models. While any nondeterministic model may be used by the system, for convenience, the various processes, functionality, and interactive graphical user interfaces related to the system may be described respective to operation with LLMs. The system can, for example, advantageously enable users to chain LLMs together with other types of functions, such as, for example, specialized functions, machine learning models, optimization models, data lakes/sources of truth (such as an ontology of data objects), and/or the like.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

An ontology as discussed herein may refer to stored information that provides a data model for storage of data in one or more databases/data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

A data object or object (also referred to herein as data entities or entities) can be a data container for information representing a specific thing in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties. Attributes may include, for example, a geographic location associated with the item, a value associated with the item, a probability associated with the item, an event associated with the item, and so forth.

An object type is a type of a data object (e.g., person, event, document, and/or the like). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

A link is connection between two (or more) data objects, based on, for example, a relationship, an event, and/or matching properties. Links may be directional, such as one representing a payment from person A to B, or bidirectional.

Example Aspects Related to Data Input Permissions

The system can be used to manage access to data objects, data tools, data sets, databases and/or other computer resources (generally referred to herein as "data inputs") for use with nondeterministic models. The data inputs can have sets of rules, such as permissions, constraints, qualifications, authorizations, security markings, access controls, and the like (generally referred to herein as "permissions") that govern the access to each data input. Each required permission may be indicated by one or more permission indicia associated with a data input. In order to access a data input, the permissions associated with the data input must be satisfied by access credentials. Access credentials may be associated with and/or used by a user, the system, or a nondeterministic model to gain access to one or more data inputs.

The system may support the notion of permission transitivity. For example, suppose the system records permissions for two data inputs referred to in this example as "Input 1" and "Input 2." Further suppose the system generates a third data input which is referred to in this example as "Input 3." Input 3 may use data from Input 1 and Input 2 to create portions of Input 3. After Input 3 is created, it may be decided, according to organizational policy, that a permission is required to access the data of Input 2. In this case, because the system records the dependency of Input 3 on Input 2, the permissions applied to Input 2 are propagated to Input 3. As such, access credentials that are required for accessing Input 2 are also required to access Input 3.

The transitive effect of permission applications (or permission removals) can apply to an arbitrary number of levels dependency. For example, returning to the above example, permissions may be transitively applied for any data input that depends directly or indirectly on the Input 3.

According to some implementations, where permissions tracking in the system has column/row level granularity. Then permission transitivity may apply at the more fine-grained column/row level. In this case, permissions may be applied (or removed) on a particular column/row of a dataset and based on the column/row-level permission tracking in the system. Further, permissions may be transitively applied (or removed) on all direct or indirect descendent columns/rows of that column/row. According to some implementations, where permissions tracking in the system has data cell level granularity, permissions may be applied (or removed) on a particular data cell and may be transitively applied (or removed) on all direct or indirect descendants of the particular data cell. According to some implementations, where permissions tracking in the system has function level granularity, permissions may be applied (or removed) on a particular function and may be transitively applied (or removed) on all direct or indirect descendants of the particular function, such as data derived using the particular function.

According to some implementations, permission transitivity may apply to the output of a nondeterministic models. For example, the output of a nondeterministic model may contain permissions associated with the data inputs used for the nondeterministic model, as described in more detail below. The system may record the dependency of the output of the nondeterministic model to the data inputs used for the nondeterministic model and transitively apply changes of the permissions of the data inputs to the output of the nondeterministic model.

Example Aspects Related to Permissions of Nondeterministic Models

Determining a permission to apply to the output of a nondeterministic model can be difficult due to the opaque nature of how nondeterministic models access and process information. For example, a nondeterministic model may use different data and processes to perform two queries with identical prompts. Advantageously, the system may operate to apply permissions to nondeterministic model outputs during runtime operation of nondeterministic models by determining during runtime operations what data inputs a nondeterministic model accesses. The system can then apply all, or a portion of the permissions to a nondeterministic model output that are associated with each data input a nondeterministic model access during runtime. Advantageously, the system allows for two queries with identical prompts to result in output with two different permissions applied based on different sets of data inputs used for each of the two queries.

Example Aspects Related to Determining the Data Inputs a Nondeterministic Model Accesses Determining during runtime operation what data inputs a nondeterministic model accesses can be difficult. For instance, it can be difficult to predict and/or determine which data inputs a nondeterministic model may use based on the prompt given to the nondeterministic model. For example, a nondeterministic model that is given identical prompts multiple times and allowed to access an identical set of data inputs for each prompt may access different subsets of the set of data inputs for each query of the prompt. Advantageously, the system can determine, during the runtime of a query, which data inputs are accessed or otherwise used for the query.

In some implementations, the system can determine the data inputs used for queries by providing a nondeterministic model a set of data inputs that can be used by the nondeterministic model for each query. For example, the system may determine that for a specific query, a nondeterministic model can access a specific set of data inputs. In this example, the system may only provide the specific set of data inputs to the nondeterministic model.

A scope of a set data inputs provided to the nondeterministic model may vary. The set of data inputs for a specific query may contain a total set of the data inputs associated with a user's access credentials (i.e., all the data inputs associated with a user's access credentials). The set of data inputs for a specific query may contain only a portion, or a reduced set, of the data inputs associated with a user's access credentials. The system may determine the scope of the set of data inputs based on one or more user inputs such as the prompt for the query, the access credentials of one or more users associated with the query, data flags indicating one or more data inputs for the query contain confidential information, a request or other indication from a nondeterministic model and/or other considerations for limiting the scope of data inputs for a nondeterministic model.

In some implementations, the system may determine during runtime operation of a query what data inputs a nondeterministic model accesses from the set of data inputs. For example, the system may assume that every data input in the set of data inputs was accessed by the nondeterministic model for the query.

Example Aspects Related to Determining the Scope of a Listing of Data Inputs The system may determine the scope of a set of data inputs to be provided to a nondeterministic model based, at least in part, on the access credentials of a user providing a prompt for a nondeterministic model. For example, the user may not have the access credentials to access certain data inputs. In this example, the system may determine the access credentials of the user providing the prompt and provide the nondeterministic model a set of data inputs that excludes the data inputs the user does not have access credentials for.

The system may determine the scope of a set of data inputs to be provided to a nondeterministic model based, at least in part, on one or more user inputs indicating a reduced level of access credentials or permissions for a query. For example, a user may want a subset of the data input the user has access credentials to access to be excluded from the query. In this example, the user may indicate to the system that the subset should be excluded, and the system may provide the nondeterministic model a set of data inputs that does not include the subset. In this way, the system may run a nondeterministic model using a reduced set of data input from the set of input data a user has access credentials to access.

The system may determine the scope of a set of data inputs to be provided to a nondeterministic model based, at least in part, on a prompt for a query. For example, the system may determine one or more data inputs are to be used based on the prompt and provide the nondeterministic model a set of data inputs that includes the determined one or more data inputs.

The system may determine the scope of a set of data inputs to be provided to a nondeterministic model based, at least in part, on permissions, or otherwise flagged data, indicating one or more data inputs for the query contain confidential information. For example, the set of data inputs may exclude any data inputs that contain confidential or restricted information. In some implementations, the set of data inputs will exclude the entire data input that contains the confidential or restricted information. In some implementations, the set of data inputs will exclude only the confidential or restricted information (e.g., individual data cells, data ranges, data columns, individual functions, etc.).

The system may determine the scope of a set of data inputs to be provided to a nondeterministic model based, at least in part, from an input received from the nondeterministic model. For example, the nondeterministic model may determine one or more data inputs for a query based on the prompt for the query, the access credentials of the user providing the prompt for the query, and/or user input providing the access credentials or permissions associated with the query. In this example, the nondeterministic model may request access from the system to, or otherwise indicate, one or more data inputs to use for the query. The system may provide the nondeterministic model a set of data inputs that includes the requested data inputs.

Example Aspects Related to Applying Permissions to the Output of Nondeterministic Models The system may apply permissions to the output of a nondeterministic model by first determining the permissions required by the scope of a set of data inputs passed to the nondeterministic model. The permissions required by the scope of a set of data inputs can include every permission associated with the set of data inputs. A system may execute and query and apply the determined permissions required by the set of data inputs to the output of the nondeterministic model. In some implementations, a system may only apply a subset of the determined permissions required by the set of data inputs to the output of the nondeterministic model. For example, the system may present a user (e.g., the user providing a prompt for the nondeterministic model) with the set of permissions that is to be applied to the output of the nondeterministic model and receive input from the user removing one or more permissions. In this example, the set of data inputs may have included data inputs with specific confidential information (e.g., personal information), but the user may determine that the specific confidential information is not presented by the output of the nondeterministic model (e.g., the personal information was removed). As such, the user may determine that the output need not include the data permissions required to access the specific confidential information. In another example, the system may present a user with the set of permissions is to be applied to the output of the nondeterministic model and receive input from the user confirming the set permissions or indicating that additional permissions are to be added to the set of permissions. The system may alter the set of permissions based on user input. For example, by adding one or more permissions to the set of permissions.

Example Aspects Related to Determining which Permissions to Apply to the Output of Nondeterministic Models Each data input used by a nondeterministic model may have different permissions. The permissions for data inputs may be related. For example, two data inputs may share a common set of permissions, "Permission A" and "Permission B" alone, or in combination with other permissions. Data inputs with related permissions may have relative levels of stringency. For example, a first data input may be associated with "Permission A" and "Permission B," while a second data input may be associated with "Permission A," "Permission B," and "Permission C." In this example, the second data input has a stricter level of permission relative to the first data input. The permissions for data inputs may have not commonality. For example, a third data input may be associated with "Permission D" while a fourth data input is associated with "Permission E."

In some implementations, the system determines the permissions to apply to the output of a nondeterministic model by determining the most stringent combination of the permissions associated with the data input. For example, the system may determine to apply every permission associated with the data inputs to the output of the nondeterministic model. In some implementations, the system determines the permissions to apply to the output of a nondeterministic model by determining a reduced combination of the permissions associated with the data input. For example, the system may determine to apply a portion of the permissions associated with the data inputs based on user input, indication from a nondeterministic model, or other rule in the system.

Example Aspects Related to Redacting the Output of Nondeterministic Models

The system, or a user of the system, may alter the permission of the output of a nondeterministic model by parsing the output of the nondeterministic model and redacting (e.g., removing or obscuring) portions of the output. For example, the output of a nondeterministic model may have permissions applied associated with personal confidential information. In this example, the system may redact the personal confidential information and remove the associated permissions from the output of the nondeterministic model. In some implementations, the output of the nondeterministic model may have a split permission that allows those with the access credentials for the redacted material to access the unredacted output of the nondeterministic model. In some implementations, the system can determine the output of a nondeterministic model is accessed without the required access credentials and redact a portion of the output.

Example Aspects Related to the User Interfaces

The system can include interactive graphical user interfaces that enable adding, changing, and/or applying permissions, entering descriptions of tasks, entering prompts, indicating a reduced level of access credential or permissions for a query, selecting data inputs, altering a set of data inputs for a query, redacting or removing portions of the output of a nondeterministic model, etc. For example, the user interfaces can receive one or more inputs from the interactive graphical user interface and alter the permissions applied to the output of a nondeterministic model. The system can output one or more permissions to the user interface. For example, the system can output permissions applied to the output of a nondeterministic model in a consistent format.

II. Example Data Input Management System and Related Computing Environment

FIG. 1 illustrates an example computing environment 100 including a data input management system 120 (referred to herein as "system 120"). The system 120 may include a user interface service 121, a context service 123, a data input service 124, one or more data input(s) 125, one or more permission(s) 127, a permission(s) management service 128, and one or more nondeterministic model(s) 130. The system 120 may be connected via network 110 to other computing devices, such as user device(s) 150 and external system(s) 140. External system(s) 140 may include one or more external data input(s) 141 and one or more nondeterministic models 130. For example, user device(s) 150 may transmit a prompt or a request to the system 120, to utilize the data input(s) 125, the external data input(s) 141, and/or the nondeterministic model(s) 130 on the system 120 and/or on the external system(s) 140. The system 120 may receive the request from the user device(s) 150 and in response, transmit the prompt or request to the external system(s) 140 to utilize the external data input(s) 141 and/or the nondeterministic model(s) 130. The external system(s) 140 may receive the request from the system 120 and in response, execute one or more nondeterministic model(s) 130, and transmit to the user device(s) 150 and/or the system 120 information based on the results of the nondeterministic model(s) 130.

The data input service 124 may manage the data inputs(s) 125 and/or interface with the external system 140 to manage the external data inputs(s) 141 for use with the nondeterministic model(s) 130. As previously described, the data input(s) 125 and external data input(s) 141 may can include data objects, data tools, data sets, and/or other computer resources. Data objects can include any of the components of data object 281 described in further detail in FIG. 2. Data sets can include one or more compiled data objects or other data values. For example, a data set can include multiple data values compiled into a database.

Data tools can include functions, processes, and/or services (or "plug-ins") for processing data. The data tools may include one or more search services (e.g., a table search service, an object search service, a text search service, or any other appropriate search service), indexing services, services for formatting text or visual graphics, services for generating, creating, embedding and/or managing interactive objects in a graphical user interface, services for caching data, services for writing to databases, an ontology traversing service (e.g., for traversing an ontology or performing search-arounds in the ontology to surface linked objects or other data items) or any other services. For example, the nondeterministic model(s) 130 may request (either directly or through the system 120) for data tools to perform a specific process. In some implementations, the data tools may be a part of the system 120 (e.g., as part of data input(s) 125). In some implementations, the data tools may be external to the system 120.

The data input service 124 can determine, during the runtime of a query, which data input(s) 125 and/or external data input(s) 141 are accessed or otherwise used for the query.

In some implementations, the data input service 124 can determine the data input(s) 125 and/or external data input(s) 141 used for queries by providing a nondeterministic model 130 a set of data inputs that can be used by the nondeterministic model for each query. For example, the data input service 124 may determine that for a specific query, a nondeterministic model 130 can access a specific set of data input(s) 125 and/or external data input(s) 141. In this example, the system may only provide the specific set of data inputs to the nondeterministic model 130.

A scope of a set data inputs, such as a set of data input(s) 125 and/or external data input(s) 141, the data input service 124 provides to a nondeterministic model 130 may vary. The set of data inputs for a specific query may contain all the data input(s) 125 and external data input(s) 141 associated with a user's access credentials. The set of data inputs for a specific query may contain only a portion of the data input(s) 125 and external data input(s) 141 associated with a user's access credentials. The data input service 124 may determine the scope of the set of data inputs based on one or more user inputs such as the prompt for the query, the access credentials of one or more users associated with the query, data flags indicating one or more data input(s) 125 and/or external data input(s) 141 used for the query contain confidential information, a request or other indication from a nondeterministic model 130 and/or other considerations for limiting the scope of data input(s) 125 and/or external data input(s) 141 for a nondeterministic model.

The data input service 124 may determine the scope of a set of data inputs to be provided to a nondeterministic model 130 based, at least in part, on the access credentials of a user providing a prompt for a nondeterministic model. For example, the user may not have the access credentials to access certain data input(s) 125 and/or external data input(s) 141. In this example, the data input service 124 may determine the access credentials of the user providing the prompt and provide the nondeterministic model 130 a set of data inputs that excludes the data input(s) 125 and/or external data input(s) 141 the user does not have access credentials for.

The data input service 124 may determine the scope of a set of data inputs to be provided to a nondeterministic model 130 based, at least in part, on one or more user inputs indicating a reduced level of access credentials or permissions for a query. For example, a user may want a subset of the data input(s) 125 and/or external data input(s) 141 the user has access credentials to access to be excluded from the query. In this example, the user may indicate to the system that the subset should be excluded, and the system may provide the nondeterministic model 130 a set of data inputs that does not include the subset. In this way, the system may run a nondeterministic model 130 using a reduced set of data input from the set of input data a user has access credentials to access.

The data input service 124 may determine the scope of a set of data inputs to be provided to a nondeterministic model 130 based, at least in part, on a prompt for a query. For example, the system may determine one or more data input(s) 125 and/or external data input(s) 141 are to be used based on the prompt and provide the nondeterministic model 130 a set of data inputs that includes the determined one or more data input(s) 125 and/or external data input(s) 141.

The data input service 124 may determine the scope of a set of data inputs to be provided to a nondeterministic model 130 based, at least in part, on permissions, or otherwise flagged data, indicating one or more data input(s) 125 and/or external data input(s) 141 for the query contain confidential information. For example, the set of data inputs may exclude any data input(s) 125 and/or external data input(s) 141 that contain confidential or restricted information. In some implementations, the set of data inputs will exclude the entire data input(s) 125 and/or external data input(s) 141 that contains the confidential or restricted information. In some implementations, set of data inputs will exclude only the confidential or restricted information (e.g., individual data cells, data ranges, data columns, individual functions, etc.).

The data input service 124 may determine the scope of a set of data inputs to be provided to a nondeterministic model based, at least in part, from an input received from the nondeterministic model 130. For example, the nondeterministic model 130 may determine one or more data input(s) 125 and/or external data input(s) 141 for a query based on the prompt for the query, the access credentials of the user providing the prompt for the query, and/or user input providing the access credentials or permissions associated with the query. In this example, the nondeterministic model 130 may request access from the system to, or otherwise indicate, one or more data input(s) 125 and/or external data input(s) 141 to use for the query. The system may provide the nondeterministic model 130 a set of data inputs that includes the requested data input(s) 125 and/or external data input(s) 141.

The permission management service 128 may manage the permission(s) 127 applied to the data input(s) 125 and/or external data input(s) 141 and apply permission(s) 127 to the output of the nondeterministic model(s) 130. As previously described, data inputs, such as data input(s) 125 and/or external data input(s) 141, can have sets of rules, such as permissions, constraints, qualifications, authorizations, security markings, access controls, and the like (generally referred to herein as "permissions") that govern the access to each data input. Each required permission (such as permission(s) 127) may be indicated by one or more permission indicia associated with a data input. In order to access a data input, the permissions associated with the data input must be satisfied by access credentials. Access credentials may be associated with and/or used by a user, the system, or a nondeterministic model to gain access to one or more data inputs.

The permissions management service 128 may determine the permissions 127 to apply to the output of the nondeterministic model(s) 130. Advantageously, the permissions management service 128 may operate to apply permission(s) 127 to the output of a nondeterministic model 130 by determining during runtime operations of the nondeterministic model 130 what data input(s) 125 and external data input(s) 141 the nondeterministic model 130 accesses. For example, the data input service 124 can communicate which data input(s) 125 and external data input(s) 141 are accessed by the nondeterministic model 130. The permissions management service 128 can then apply all, or a portion of the permission(s) to the output of the nondeterministic model 130 that are associated with each data input 125 and/or external data input 141. Advantageously, the data input service 124 and the permissions management service 128 allows the system to perform two queries with identical prompts and apply two different permission(s) 127 to the output of the nondeterministic model(s) 130 based on different sets of data input(s) 125 and external data input(s) 141 used for each of the two queries.

In some implementations, the system may determine during runtime operation of a query what data input(s) 125 and/or external data input(s) 141 a nondeterministic model accesses from the set of data inputs. For example, the system may assume that every data input in the set of data inputs was access by the nondeterministic model for the query.

The permissions management service 128 may apply permission(s) 127 to the output of a nondeterministic model 130 by first determining the scope of a set of data inputs passed to the nondeterministic model 130. For example, the permissions management service 128 may receive the scope of a set of data inputs from the data input service 124. The permission(s) 127 required by the scope of a set of data inputs can include every permission 127 associated with the set of data inputs. The permissions management service 128 may apply the determined permission(s) 127 required by the scope of a set of data inputs to the output of the nondeterministic model 130. In some implementations, the permissions management service 128 may only apply a subset of the determined permission(s) 127 required by the scope of a set of data inputs to the output of the nondeterministic model 130. For example, the permissions management service 128 may present a user (e.g., the user providing a prompt for the nondeterministic model) with the set of permission(s) 127 that is to be applied to the output of the nondeterministic model 130 and receive input from the user removing one or more permission(s) 127. In this example, the set of data inputs may have included data input(s) 125 and/or external data input(s) 141 with specific confidential information (e.g., personal information); however, the user may have determined that the specific confidential information is not presented by the output of the nondeterministic model 130 (e.g., the personal information was removed). As such, the user may indicate that the output need not include the permission(s) 127 required to access the specific confidential information. In another example, the permissions management service 128 may present a user with a set of permission(s) 127 to be applied to the output of the nondeterministic model and receive input from the user confirming the set permission(s) 127 or indicating that additional permission(s) 127 are to be added to the set of permission(s) 127. The permissions management service 128 may alter the set of permission(s) 127 based on the user input. For example, by adding one or more permission(s) 127 to the set of permission(s) 127.

Each data input 125 and external data input 141 used by a nondeterministic model 130 may have different permission(s) 127. The permission(s) 127 for data inputs may be related. For example, two data inputs may share a common set of permissions 127, "Permission A" and "Permission B" alone, or in combination with other permission(s) 127. Data inputs with related permissions 127 may have relative levels of stringency. For example, a first data input may be associated with "Permission A" and "Permission B," while a second data input may be associated with "Permission A," "Permission B," and "Permission C." In this example, the second data input has a stricter level of permission(s) 127 relative to the first data input. The permission(s) 127 for data inputs may have not commonality. For example, a third data input may be associated with "Permission D" while a fourth data input is associated with "Permission E."

In some implementations, the permissions management service 128 determines the permission(s) 127 to apply to the output of a nondeterministic model 130 by determining the most stringent combination of the permission(s) 127 associated with the data input(s) 125 and/or external data input(s) 141. For example, the permissions management service 128 may determine to apply every permission 127 associated with the data input(s) 125 and/or external data input(s) 141 to the output of the nondeterministic model 130. In some implementations, the permissions management service 128 determines the permission(s) 127 to apply to the output of a nondeterministic model 130 by determining a reduced combination of the permission(s) 127 associated with the data input(s) 125 and/or external data input(s) 141. For example, the permissions management service 128 may determine to apply a portion of the permission(s) 127 associated with the data input(s) 125 and/or external data input(s) 141 based on user input, indication from a nondeterministic model 130, or other rule in the system 120.

The permissions management service 128 may alter the permission of the output of a nondeterministic model 130 by parsing the output of the nondeterministic model 130 and redacting (e.g., removing or obscuring) portions of the output. For example, the output of a nondeterministic model

130 may have permission(s) 127 applied that are associated with personal confidential information. In this example, the permissions management service 128 may redact the personal confidential information and remove the associated permission(s) 127 from the output of the nondeterministic model 130. In some implementations, the output of the nondeterministic model 130 may have split permission(s) 127 that allows those with the access credentials for the redacted material to access the unredacted output of the nondeterministic model 130. In some implementations, the permissions management service 128 can determine the output of a nondeterministic model 130 is accessed without the required access credentials and redact a portion of the output.

The user interface service 121 is configured to generate user interface data that may be rendered on a user device 150, such as to receive an initial user input, as well as later user input that may be used to initiate further data processing. In some implementations, the functionality discussed with reference to the user interface service 121, and/or any other user interface functionality discussed herein, may be performed by a device or service outside of the system 120 and/or the user interface service 121 may be outside the system 120. For example, the user interface service 121 may be comprised, in whole or in part, on the user device 150.

The context service 123 is configured to maintain, select, and/or provide some or all relevant context associated with a user input, user session, multiple sessions of the user, and/or other context. The context service 123 may store context for various groups of users, e.g., user inputs from multiple users. The system 120 and/or components of the system 120 may make use of context in fulfilling their functions. Context may include, for example, all or part of a conversation history from one or more sessions with the user (e.g., a sequence of user inputs and responses or results), user selections (e.g., via a point and click interface or other graphical user interface), data tools implemented during the session, user-selected objects and any corresponding properties for those objects, any linked objects as defined by a relevant ontology, and the like. As one example, if a most recent result returned to a user included a filtered set of "flight" objects, and a user types "send an email listing the flights to my manager," the system 120 may make use of the context of the filtered set of aircraft objects, as provided by the context service 123, and include a list of those objects in an email.

In some implementations, the user interface service 121 may suggest certain actions to the user (e.g., any actions described herein, or any other related actions) based on context provided by context service 123 (e.g., email the account manager of the account that is being displayed).

Users may use user device(s) 150 to view and/or interact with a GUI provided by the user interface service 121. For example, the user device(s) 150 can include a wide variety of computing devices, including personal computing devices, terminal computing devices, laptop computing devices, tablet computing devices, electronic reader devices, mobile devices (e.g., desktop computer, notebook computer, smartphone, or any other type of computing device) and associated software (e.g., a browser capable of rendering output from information provided by, for example, user interface service 121).

The external system(s) 140 can be a third-party server and/or data store implemented as a computer system having logical elements. In an implementation, the logical elements may comprise program instructions recorded on one or more machine-readable storage media. Alternatively, the logical elements may be implemented in hardware, firmware, or a combination thereof. The external system(s) 140 may include one or more modules. In one example, the external system(s) 140 can include external data input(s) 141 and one or more nondeterministic model(s) 130. As such, external data input(s) 141 and the nondeterministic model(s) 130 can be located external to the system 120, for example within one or more external system(s) 140. External data input(s) 141 and the nondeterministic model(s) located on the external system(s) 140 can be functionally similar or the same data input(s) 125 and/or the nondeterministic model(s) 130 located within the system 120, and may be accessed, for example, via one or more APIs and/or the like.

Figure 7:
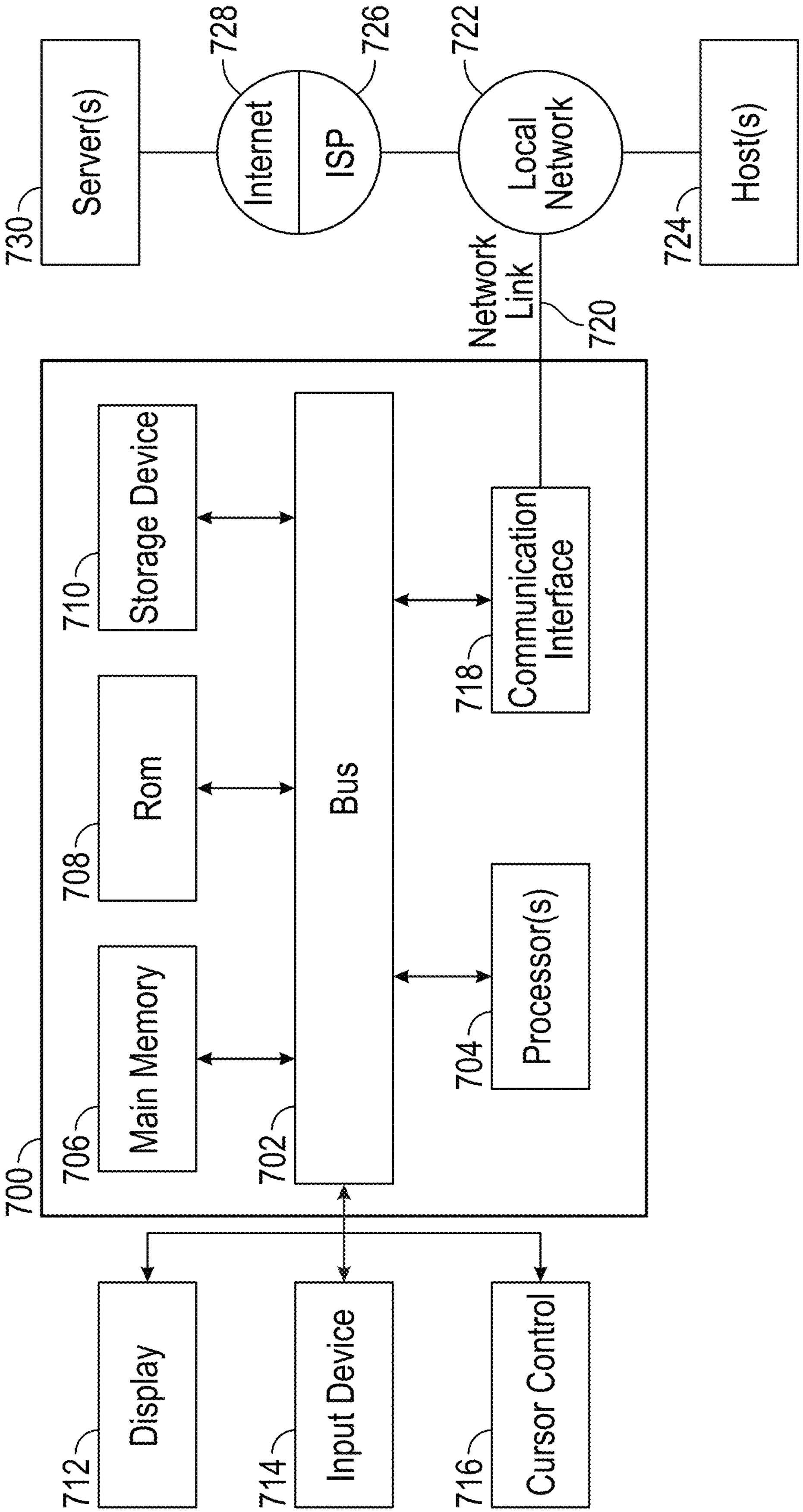
FIG. 7 is a block diagram of an example computer system consistent with various implementations of the present disclosure.

The network 110 can include any one or more communications networks, such as the Internet. The network 110 may be any combination of local area networks ("LAN") and/or a wireless area networks ("WAN") or the like. Accordingly, various components of the computing environment 100, including the system 120, can communicate with one another directly or indirectly via any appropriate communications links and/or networks, such as network 110 (e.g., one or more communications links, one or more computer networks, one or more wired or wireless connections, the Internet, any combination of the foregoing, and/or the like). Similarly, the various components (e.g., as described below) of the system 120 and the computing environment 100 may, in various implementations, communicate with one another directly or indirectly via any appropriate communications links (e.g., one or more communications links, one or more computer networks, one or more wired or wireless connections, the Internet, any combination of the foregoing, and/or the like). FIG. 7 described below, provides additional examples of aspects of implementations of such components of the computing environment 100, the system 120, and the like.

Figure 2:
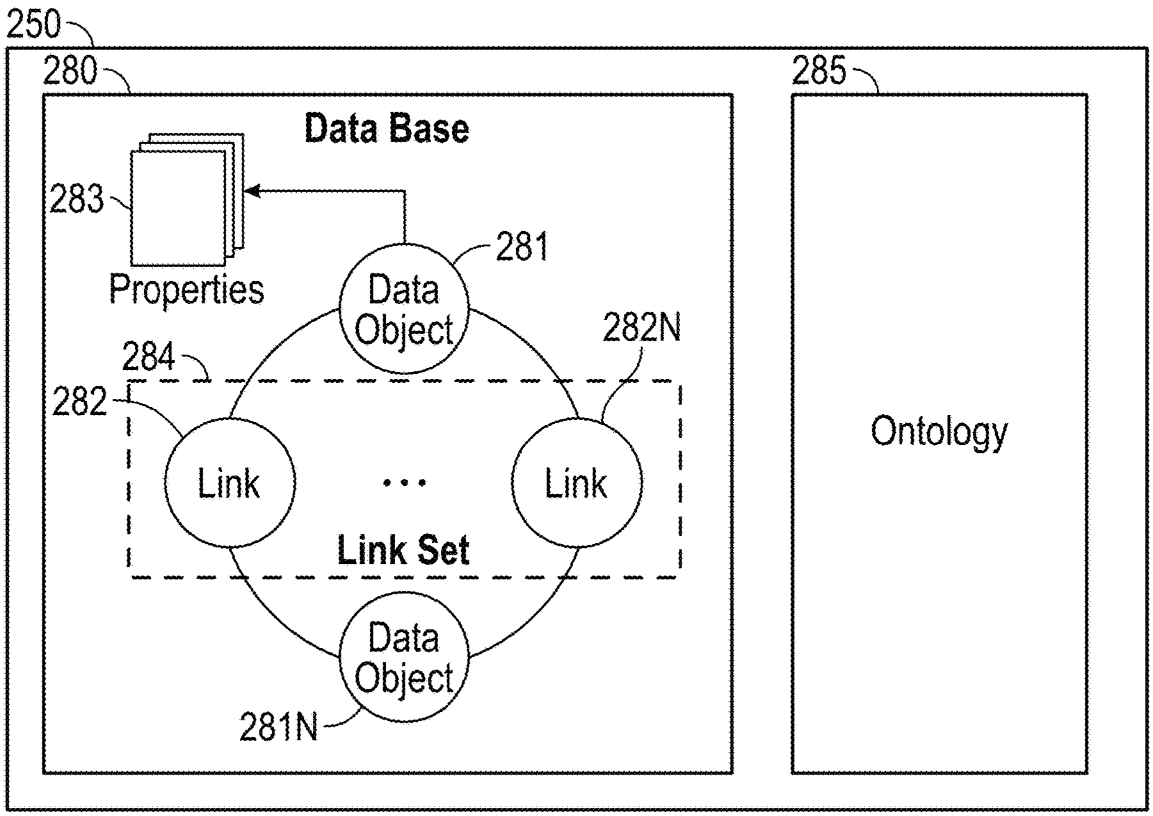
FIG. 2 is a schematic block diagram of an example object-centric conceptual data model for use by, for example, the data input management system.

III. Example Aspects Related to Data Inputs, Data Outputs, and/or a Data Model FIG. 2 is a schematic block diagram of an object-centric conceptual data model for use by, for example, the data input management system 120. The example visualization system 250 may correspond to the system 120 of FIG. 1 or any of the subcomponents of the system 120. This description is provided for the purpose of providing an example and is not intended to limit the techniques to the example data model, the example database system, or the use of an ontology to represent information.

In one implementation, a body of data, such as a data input 125 or an external data input 141, is conceptually structured according to an object-centric data model represented by the ontology 285. The conceptual data model is independent of any particular database used for durably storing one or more database(s) 280 based on the ontology 285. For example, each object of the conceptual data model may correspond to one or more rows in a relational database or an entry in Lightweight Directory Access Protocol (LDAP) database, or any combination of one or more databases. In some implementations, the database 280 may comprise one or more of data input(s) 125 and/or the external data input(s) 141 previously described.

An ontology 285 may include stored information providing a data model for storage of data in the database 280. The ontology 285 may be defined by one or more object types, which may each be associated with one or more property types. At the highest level of abstraction, data object 281 is a container for information representing things in the world.

In some examples, data object 281 may be a data input of the data input(s) 125 and/or the external data input(s) 141 or a piece a data input. For example, data object 281 can represent an entity such as a person, a place, an organization, a market instrument, or other noun. Data object 281 can represent an event that happens at a point in time or for a duration. Data object 281 can represent a document or other unstructured data source such as an e-mail message, a news report, or a written paper or article. Each data object 281 is associated with a unique identifier that uniquely identifies the data object within the database system.

Different types of data objects may have different property types. For example, a "Person" data object might have an "Eye Color" property type and an "Event" data object might have a "Date" property type. Each property 283 as represented by data in the visualization system 250 may have a property type defined by the ontology 285 used by the database 280.

Objects may be instantiated in the database 280 in accordance with the corresponding object definition for the particular object in the ontology 285. For example, a specific monetary payment (e.g., an object of type "event") of US$30.00 (e.g., a property of type "currency") taking place on Mar. 27, 2009 (e.g., a property of type "date") may be stored in the database 280 as an event object with associated currency and date properties as defined within the ontology 285. The data objects defined in the ontology 285 may support property multiplicity. In particular, a data object 281 may be allowed to have more than one property 283 of the same property type. For example, a "Person" data object might have multiple "Address" properties or multiple "Name" properties.

Each data object 281 and/or each property 283 of each data object 281 may be associated with one or more permissions, such as permission(s) 127 of FIG. 1. Each permission associated with a data object 281 and/or property 283 may be stored with the unique identifier of the associated data object 281 and tracked in the ontology 285. For example, a data object 281 defined in the ontology 285 may include one or more permissions associated with the data object 281 and one or more permissions associated with the properties 283 of the data object 281.

Each link 282 represents a connection between two data objects 281. In one implementation, the connection is either through a relationship, an event, or through matching properties. In one implementation, the connection is through one or more permissions associated with the two data objects 281. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one implementation, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one implementation, a link between two data objects may be established based on similar or matching properties (e.g., property types and/or property values) of the data objects. These are just some examples of the types of connections that may be represented by a link and other types of connections may be represented; implementations are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

As an example of matching permissions properties connection, two data objects representing a brother and a sister, may both have an "Address" property that indicates where they live. The "Address" property of the brother and sister may be considered confidential and marked with a permission. The link between these two objects may establish that an access credential that allows for the access of the "Address" property of the brother also allows for the access of the "Address" property of the sister.

Each data object 281 can have multiple links with another data object 281 to form a link set 284. For example, two "Person" data objects representing a husband and a wife could be linked through a "Spouse Of" relationship, a matching "Address" property, and one or more matching "Event" properties (e.g., a wedding). Each link 282 as represented by data in a database may have a link type defined by the database ontology used by the database.

IV. Example Aspects Related to Propagation and/or Application of Permissions

Figure 3:
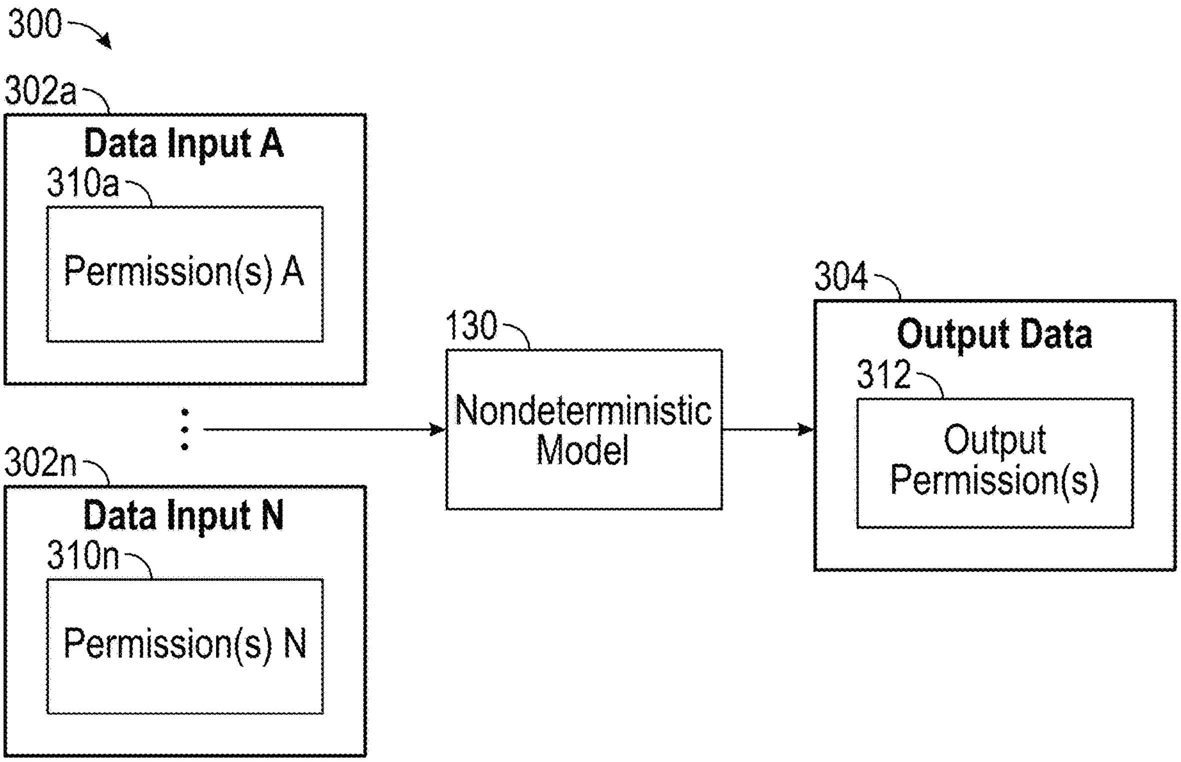
FIG. 3 is a schematic block diagram of an example computing environment for applying permissions to the output of a nondeterministic model.

FIG. 3 is a schematic block diagram of an example computing environment 300 for applying one or more output permission(s) 312 to output data 304 based, at least in part, on permissions associated with one or more data inputs (e.g., Permission A). The environment 300 may represent at least a portion of, at least in part be implemented by, comprise a part of, and/or illustrate functionality of, the system 120. The environment 300 may include one or more data inputs, such as Data Input A 302*a* through Data Input N 302*n*. The set of data inputs Data Input A 302*a* through Data Input N 302*n* may include some or all of the data inputs a user can access (i.e., all the data inputs associated with the user's access credentials). The set of data inputs Data Input A 302*a* through Data Input N 302*n* may be a subset of the data inputs a user can access (i.e., the set of data inputs Data Input A 302*a* through Data Input N 302*n* may be a reduced set of data inputs compared to a total set of data inputs accessible by the user).

The data inputs may be used to execute, or as part of, a query of a nondeterministic model 130 (or one or more nondeterministic models). The data inputs may be determined by a computing system, such as the system 120, in the manner described in FIG. 1. Each data input may be associated with one or more permissions (e.g., Data Input A 302*a* is illustrated as being associated with the Permission(s) A 310*a*).

The output data 304 may include an output of the nondeterministic model 130 and/or data derived from an output of the nondeterministic model 130. For example, the output data 304 may comprise a language response from an LLM and/or data derived from the language response. The output data may be associated with one or more permission(s) 312. The permission(s) 312 may be based on the permissions associated with the data inputs. For example, output permission(s) 312 may include at least a portion of the permission(s) A 310*a* through Permission(s) N 310*n*.

In some implementations, the output permission(s) 312 may include every permission associated with the data inputs. For example, the output permission(s) 312 may include every permission in the set of permission(s) A 310*a* through Permission(s) N 310*n*. In some implementations, the output permission(s) 312 may include a subset of the permissions in the set of permission(s) A 310*a* through Permission(s) N 310*n* (i.e., the output permission(s) 312 is a reduced set of permission(s) compared to the total set of permission(s) A 310*a* through Permission(s) N 310*n*). The permission(s) in the subset may be determined by the system. For example, in response to a determination that the nondeterministic model 130 only used a subset of the data inputs, in response to a user input designating the subset, and/or the like.

In some implementations, the output permission(s) are applied after receiving one or more user inputs comprising a confirmation input. For example, a user may provide a confirmation input confirming the output permission(s) 312 include the set of permission(s) A 310*a* through Permission(s) N 310*n*. In another example, one or more of the permissions in the set of permission(s) A 310*a* through Permission(s) N 310*n* is not applied to the output permission(s) after receiving the confirmation input removing the one or more permissions.

In some implementations, environment 300 can be linked or iterated into a data pipeline. For example, output data 304 may be used as a data input for a subsequent iterative use of the nondeterministic model 130, resulting in subsequent iterations of output data 304. The permissions associated with data inputs may traverse the pipeline. For example, if data input A 302*a* is used as a data input and Permission(s) A 310*a* are included in the output permission(s) 312, when output data 304 is used for a subsequent iterative use of the nondeterministic model 130 Permission(s) A 310*a* may also be associated with the subsequent iteration of output data 304 (e.g., in a subsequent iteration of output permission(s) 312.

In some implementation, multiple environments 300 may operate simultaneously. For example, at least a first portion of the set of Data Input A 310*a* through Data Input N 310*n* may be utilized by a first nondeterministic model 130 while at least a second portion of the set of Data Input A 310*a* through Data Input N 310*n* is utilized by a second nondeterministic model 130. The first and second portions of the set of Data Input A 310*a* through Data Input N 310*n* can include some of the same data inputs, all the same data inputs, or different data inputs. The output data 304 of the first nondeterministic model 130 may be different than the output data 304 of the second nondeterministic model 130 even when the first and second portions of the set of Data Input A 310*a* through Data Input N 310*n* include the same data inputs. The output data 304 of the first nondeterministic model 130 may be substantially similar to the output data 304 of the second nondeterministic model 130.

As previously described, two queries of a nondeterministic model 130 with identical prompts may result in output data 304 with different output permission(s) 312. For example, different sets of Data Input A 310*a* through Data Input N 310*n* may be used for each queries. In another example, a system, or a user of a system, may determine that a permission in the output permission(s) 312 may be removed and remove the determined permission.

Each iteration of environment 300 or simultaneous use of environment 300 may utilize the same nondeterministic model 130. For example, the previously described first and second nondeterministic models 130 may be the same and a subsequent iterative use of the nondeterministic model 130 may be the same nondeterministic model 130 as the first use. Each iteration of environment 300 or simultaneous use of environment 300 may utilize the different nondeterministic models 130. For example, the previously described first and second nondeterministic models 130 may be the different or a subsequent iterative use of a nondeterministic model 130 may be the different nondeterministic model 130 from the first use.

V. Further Example Functionality of the Data Set Management System

Figure 4:
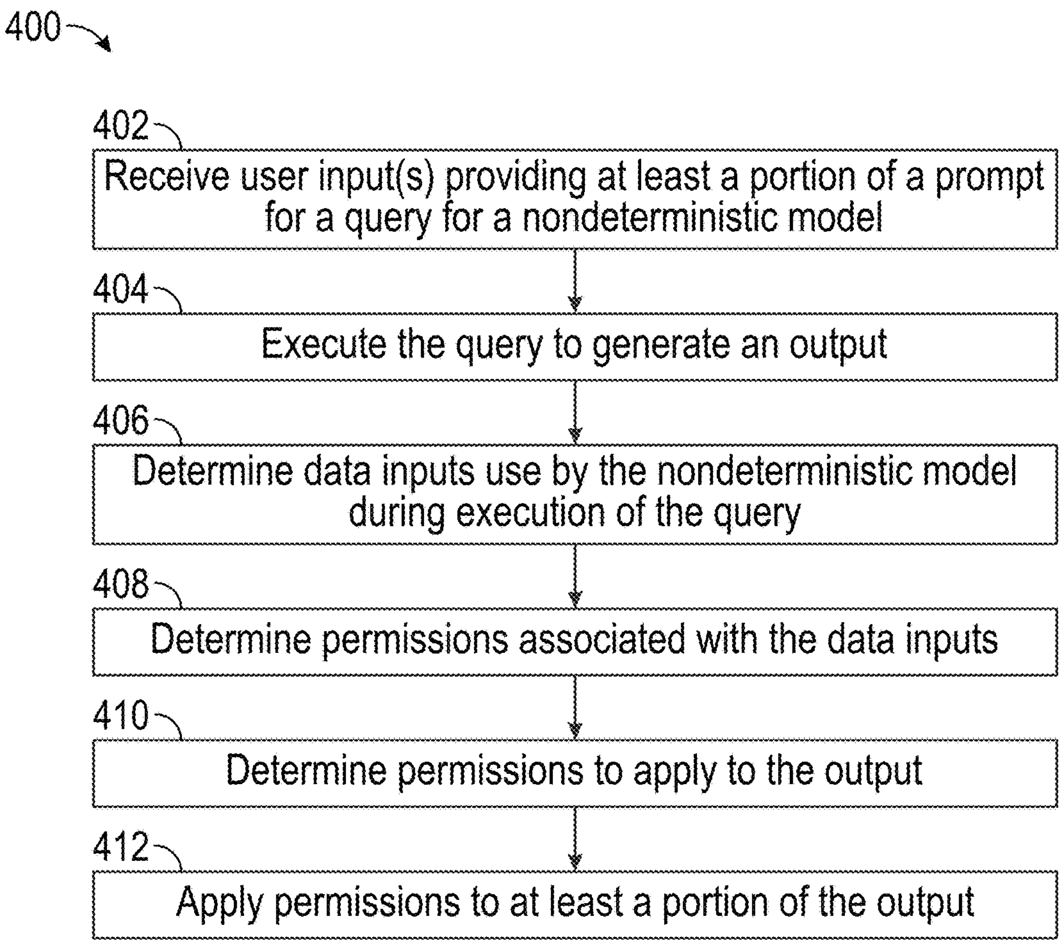
FIG. 4 is a flow chart depicting an example process for applying one or more permissions to an output of a nondeterministic model.
Figure 5:
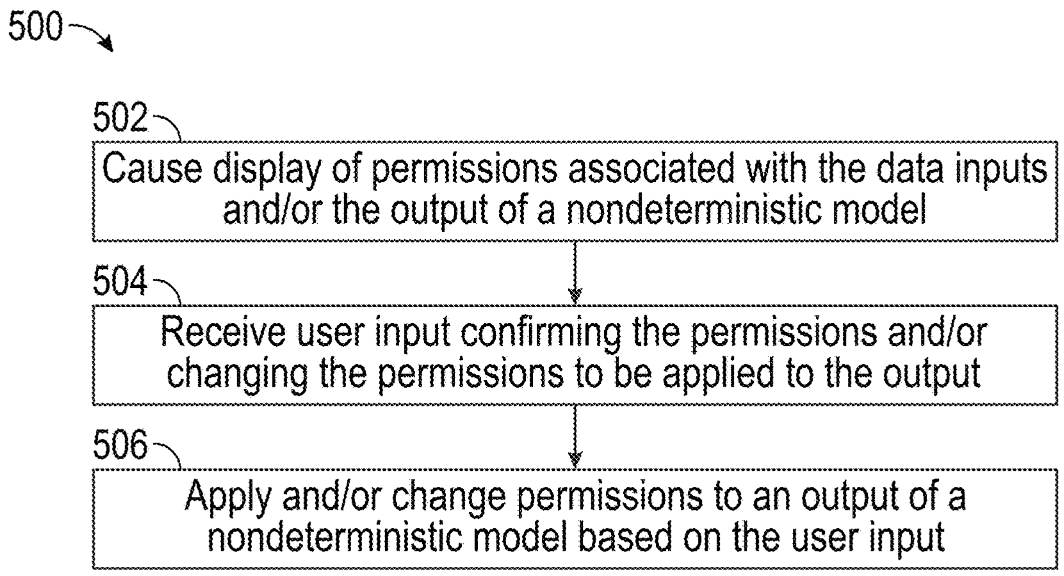
FIG. 5 is a flow chart depicting an example process for applying one or more user selected permissions to an output of a nondeterministic model.

FIGS. 4 and 5 show flow charts illustrating example operations of the system 120 (and/or various other aspects of the example computing environment 100), according to various implementations. The blocks of the flow charts illustrate example implementations, and in various other implementations various blocks may be rearranged, optional, and/or omitted, and/or additional block may be added. In various implementations, the example operations of the system illustrated in FIGS. 4 and 5 may be computer-implemented, for example, by the one or more aspects of the system 120, various other aspects of the example computing environment 100, and/or the like.

FIG. 4 is a flow chart depicting an example process 400 for applying one or more permissions to an output of a nondeterministic model. As noted above, the system may utilize one or more permissions for securing nondeterministic model output for use with other functions. The system can advantageously provide for the securing of nondeterministic model outputs by, for example, determining and/or propagating permissions information to such outputs. The system may operate to apply permissions to nondeterministic model outputs during runtime operation of nondeterministic models. While any nondeterministic model may be used by the system, for convenience, the various processes, functionality, and interactive graphical user interfaces related to the system may be described respective to operation with LLMs. The system can, for example, advantageously enable users to chain LLMs together with other types of functions, such as, for example, specialized functions, machine learning models, optimization models, data lakes/sources of truth (such as an ontology of data objects), and/or the like.

The system may operate to apply permissions to nondeterministic model outputs during runtime operation of nondeterministic models by determining during runtime operations what data inputs a nondeterministic model accesses. The system can then apply all, or a portion of the permissions to a nondeterministic model output that are associated with each data input a nondeterministic model access during runtime. Advantageously, the system allows for two queries with identical prompts to result in output with two different permissions applied based on different sets of data inputs used for each of the two queries.

The system can include interactive graphical user interfaces that enable adding, changing, and/or applying permissions, entering descriptions of tasks, entering prompts, indicating a reduced level of access credential or permissions for a query, selecting data inputs, altering a set of data inputs for a query, redacting or removing portions of the output of a nondeterministic model, etc. For example, the user interfaces can receive one or more inputs from the interactive graphical user interface and alter the permissions applied to the output of a nondeterministic model. The system can output one or more permissions to the user interface. For example, the system can output permissions applied to the output of a nondeterministic model in a consistent format.

At block 402, the system receives on or more user input(s) providing at least a portion of a prompt for a query for a nondeterministic model. For instance, the system can receive a user input, such as a language description of a task, to be used in a prompt for a nondeterministic model. For example, the system may receive user input with the task of "scheduling maintenance for the oldest piece of equipment." The prompt may be used by a nondeterministic model, such as an LLM, in the execution of the query.

At block 404, the system may cause the nondeterministic model to execute the query to generate an output. The nondeterministic model may utilize the prompt to execute the query based on the prompt. For example, in response to a prompt with the task of "scheduling maintenance for the oldest piece of equipment," the nondeterministic model may return information about maintenance scheduling, ages of pieces of equipment, etc. During the execution of the query, the nondeterministic may use one or more data inputs. For example, in some implementations the prompt used for the query may include information from data inputs.

At block 406, the system determines one or more data inputs used by the nondeterministic model during the execution of the query. As previously described, Determining during runtime operation what data inputs a nondeterministic model accesses can be difficult. For instance, it can be difficult to predict and/or determine which data inputs a nondeterministic model may use based on the prompt given to the nondeterministic model. For example, a nondeterministic model that is given identical prompts multiple times and allowed to access an identical set of data inputs for each prompt may access different subsets of the set of data inputs for each query of the prompt. Advantageously, the system can determine the one or more data inputs used by the nondeterministic model by determining, during the runtime of a query, which data inputs are accessed or otherwise used for the query.

In some implementations, the system can determine the one or more data inputs used for the query by providing the nondeterministic model a set of data inputs that can be used by the nondeterministic model for the query. For example, the system may determine that for the query, the nondeterministic model can access a specific set of data inputs. In this example, the system may only provide the specific set of data inputs to the nondeterministic model.

A scope of a set data inputs provided to the nondeterministic model may vary. The set of data inputs for the query may contain all the data inputs associated with the user's access credentials. The set of data inputs for a specific query may contain only a portion of the data inputs associated with the user's access credentials. The system may determine the scope of the set of data inputs based on one or more user inputs such as the prompt for the query, the access credentials of one or more users associated with the query, data flags indicating one or more data inputs for the query contain confidential information, a request or other indication from a nondeterministic model and/or other considerations for limiting the scope of data inputs for a nondeterministic model.

In some implementations, the system may determine during runtime operation of the query what data inputs the nondeterministic model accesses from the set of data inputs. For example, the system may assume that every data input in the set of data inputs was access by the nondeterministic model for the query.

The system may determine the scope of a set of data inputs to be provided to a nondeterministic model based, at least in part, on the access credentials of a user providing a prompt for the nondeterministic model. For example, the user may not have the access credentials to access certain data inputs. In this example, the system may determine the access credentials of the user providing the prompt and provide the nondeterministic model a set of data inputs that excludes the data inputs the user does not have access credentials for.

The system may determine the scope of a set of data inputs to be provided to a nondeterministic model based, at least in part, on one or more user inputs indicating a reduced level of access credentials or permissions for a query. For example, a user may want a subset of the data input the user has access credentials to access to be excluded from the query. In this example, the user may indicate to the system that the subset should be excluded, and the system may provide the nondeterministic model a set of data inputs that does not include the subset. In this way, the system may run a nondeterministic model using a reduced set of data input from the set of input data a user has access credentials to access.

The system may determine the scope of a set of data inputs to be provided to the nondeterministic model based, at least in part, on the prompt for the query. For example, the system may determine the one or more data inputs are to be used based on the prompt and provide the nondeterministic model a set of data inputs that includes the determined one or more data inputs.

The system may determine the scope of a set of data inputs to be provided to the nondeterministic model based, at least in part, on permissions, or otherwise flagged data, indicating one or more data inputs for the query contain confidential information. For example, the set of data inputs may exclude any data inputs that contain confidential or restricted information. In some implementations, the set of data inputs will exclude the entire data input that contains the confidential or restricted information. In some implementations, the set of data inputs will exclude only the confidential or restricted information (e.g., individual data cells, data ranges, data columns, individual functions, etc.).

The system may determine the scope of a set of data inputs to be provided to a nondeterministic model based, at least in part, from an input received from the nondeterministic model. For example, the nondeterministic model may determine one or more data inputs for a query based on the prompt for the query, the access credentials of the user providing the prompt for the query, and/or user input providing the access credentials or permissions associated with the query. In this example, the nondeterministic model may request access from the system to, or otherwise indicate, one or more data inputs to use for the query. The system may provide the nondeterministic model a set of data inputs that includes the requested data inputs.

At block 408, the system determines a set of permissions associated with the data inputs. As previously described, the system may determine the permissions required by the scope of a set of data inputs passed to the nondeterministic model. The permissions required by the scope of a set of data inputs can include every permission associated with the set of data inputs. In some implementations, the permissions required by the scope of a set of data inputs can be a subset of permission associated with the set of data inputs. For example, the system may present the user with the permissions required by the scope of a set of data inputs and receive input from the user removing one or more permissions.

At block 410, the system determines which permissions to apply to the output of the nondeterministic model. As previously described, the permissions to apply to the output of the nondeterministic model can include every permission associated with the data inputs. For example, the system may determine every permission required by the set of data inputs is to be applied to the output of the nondeterministic model. In some implementations, the system may determine only a subset of the permissions required by the set of data inputs is to be applied to the output of the nondeterministic model. For example, the system may present the user with the permission required by the set of data inputs and receive input from the user removing one or more permissions. In this example, the set of data inputs may have included data inputs with specific confidential information (e.g., personal information), but the user may determine that the specific confidential information is not presented by the output of the nondeterministic model (e.g., the personal information was removed). As such, the user may determine that the output need not include the data permissions required to access the specific confidential information. In another example, the system may present a user with the determined permissions and receive input from the user confirming the set permissions or indicating that additional permissions are to be added to the set of permissions. The system may alter the set of permissions based on user input. For example, by adding one or more permissions to the set of permissions.

As previously described, each data input used by a nondeterministic model may have different permissions. The permissions for data inputs may be related. For example, two data inputs may share a common set of permissions, "Permission A" and "Permission B" alone, or in combination with other permissions. Data inputs with related permissions may have relative levels of stringency. For example, a first data input may be associated with "Permission A" and "Permission B," while a second data input may be associated with "Permission A," "Permission B," and "Permission C." In this example, the second data input has a stricter level of permission relative to the first data input. The permissions for data inputs may have not commonality. For example, a third data input may be associated with "Permission D" while a fourth data input is associated with "Permission E."

In some implementations, the system determines the permissions to apply to the output of a nondeterministic model by determining the most stringent combination of the permissions associated with the data input. For example, the system may determine to apply every permission associated with the data inputs to the output of the nondeterministic model. In some implementations, the system determines the permissions to apply to the output of a nondeterministic model by determining a reduced combination of the permissions associated with the data input. For example, the system may determine to apply a portion of the permissions associated with the data inputs based on user input, indication from a nondeterministic model, or other rule in the system.

At block 412, the system applies one or more permissions to at least a portion of the nondeterministic output. For example, the system may apply the determined permissions to the output of the nondeterministic model.

FIG. 5 is a flow chart depicting an example process 500 for applying one or more user selected permissions to an output of a nondeterministic model. In some implementations, process 500 can be implemented in conjunction with process 400. At block 502, the system causes the display of permissions associated with one or more data inputs and/or permissions associated with the output of a nondeterministic model. For example, the system can display the set of permissions associated with the data inputs determined at block 408 of process 400. In another example, the system can display the permissions determined at block 410 of process 400.

At block 504, the system receives one or more user inputs confirming the displayed permissions and/or changing the permissions to be applied to the output of the nondeterministic model. For example, the system can receive user input confirming the permissions determined at block 408 and/or block 410 of process 400. In another example, the system can receive user input changing the permissions determined at block 408 and/or block 410 of process 400.

At block 506, the system applies and/or changes one or more permissions applied to an output of a nondeterministic model based on the user inputs. For example, the system can apply the confirmed permissions to the output of a nondeterministic model. In another example, the system can change the permissions to be applied to the output of a nondeterministic model based on the user input. In another example, the system can change the permissions previously applied to the output of a nondeterministic model based on the user input.

VI. Example Ontology System

Figure 6:
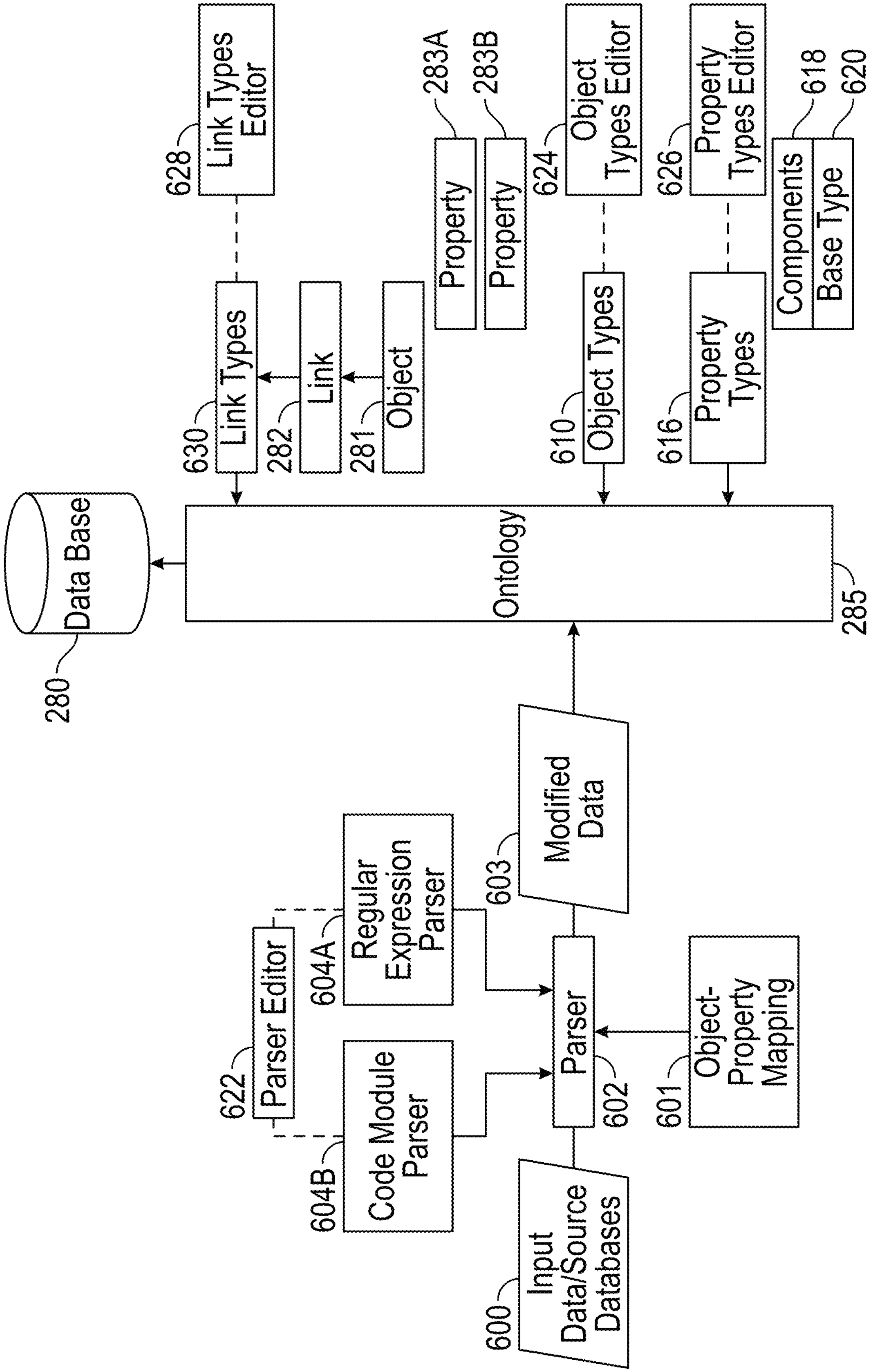
FIG. 6 is a schematic block diagram illustrating example components and data related to the data input management system.

FIG. 6 is a block diagram illustrating example components and data of the system 120 and/or other aspects of the computing environment 100 that may be used in identifying and storing data according to an ontology, such as described in FIG. 2. In this example, the ontology may be configured, and data in the data model populated, by a system of parsers and ontology configuration tools. In the implementation of FIG. 6, input data 600 is provided to parser 602. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 602 is able to read a variety of source input data types and determine which type of data it is reading.

In accordance with the discussion above, the example ontology 285 comprises stored information providing the data model of data stored in database 280, and the ontology is defined by one or more object types 610, one or more property types 616, and one or more link types 630. Based on information determined by the parser 602 or other mapping of source input information to object type, one or more data objects 281 may be instantiated in the database 280 based on respective determined object types 610, and each of the objects 281 has one or more properties 283 that are instantiated based on property types 616. Two data objects 281 may be connected by one or more links 282 that may be instantiated based on link types 630. The property types 616 each may comprise one or more data types, such as a string, number, etc. Property types 616 may be instantiated based on a base property type 620. For example, a base property type 620 may be "Locations" and a property type 616 may be "Home."

In an implementation, a user of the system uses an object type editor 624 to create and/or modify the object types 610 and define attributes of the object types. In an implementation, a user of the system uses a property type editor 626 to create and/or modify the property types 616 and define attributes of the property types. In an implementation, a user of the system uses link type editor 628 to create the link types 630. Alternatively, other programs, processes, or programmatic controls may be used to create link types and property types and define attributes, and using editors is not required.

In an implementation, creating a property type 616 using the property type editor 626 involves defining at least one parser definition using a parser editor 622. A parser definition comprises metadata that informs parser 602 how to parse input data 600 to determine whether values in the input data can be assigned to the property type 616 that is associated with the parser definition. In an implementation, each parser definition may comprise a regular expression parser 604A or a code module parser 604B. In other implementations, other kinds of parser definitions may be provided using scripts or other programmatic elements. Once defined, both a regular expression parser 604A and a code module parser 604B can provide input to parser 602 to control parsing of input data 600.

Using the data types defined in the ontology, input data 600 may be parsed by the parser 602 determine which object type 610 should receive data from a record created from the input data, and which property types 616 should be assigned to data from individual field values in the input data. Based on the object-property mapping 601, the parser 602 selects one of the parser definitions that is associated with a property type in the input data. The parser parses an input data field using the selected parser definition, resulting in creating new or modified data 603. The new or modified data 603 is added to the database 280 according to ontology 285 by storing values of the new or modified data in a property of the specified property type. As a result, input data 600 having varying format or syntax can be created in database 280. The ontology 285 may be modified at any time using object type editor 624, property type editor 626, and link type editor 628, or under program control without human use of an editor. Parser editor 622 enables creating multiple parser definitions that can successfully parse input data 600 having varying format or syntax and determine which property types should be used to transform input data 600 into new or modified input data 603.

Relationships between data objects may be stored as links, or in some implementations, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, a user interface may allow various manipulations. For example, the objects within database 280 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, use of a dynamic ontology may allow a user to take advantage of an ontological data model, while not being constrained to a hard-coded ontology. Hard-coded ontologies can be overly simple (e.g., lacking detailed semantic properties, making classification difficult but limiting analysis) or overly complex (e.g., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.). Using a data preparing and cleaning system prior to importing data into an ontology-based database system can provides the advantages of the dynamic ontology with the assurance that the data input is consistent, has no or minimal errors, and/or has been preprocessed in accordance with certain data analysis criteria to place the input data in better condition for further analysis.

Each component shown in FIG. 6 may be associated with one or more permissions. For example, data such as the input data 600, modified data 603, the data stored in the database 280, data objects 281, links 282, link types 630, properties 283A and 283B, object types 610, property types 616 components 618, and/or base types 620 may be associated with one or more permissions. In another example, functionality such as the parser editor 622, the code module parser 604B, the regular expression parser 604A, the parser 602, object-property mapping 601, the ontology 285, the link type editor 628, the object type editor 624, and/or the property type editor 626 may be associated with one or more permissions. As previously described, the permissions associated with any component in FIG. 6 may be transitively applied to functionality and data derived using the components.

VII. Additional Example Implementations and Details

In an implementation the system (e.g., one or more aspects of the system 120, one or more aspects of the computing environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 7) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, Vx Works, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 7 shows a block diagram that illustrates a computer system 700 upon which various implementations and/or aspects (e.g., one or more aspects of the computing environment 100, one or more aspects of the data input management system 120, one or more aspects of the user device(s) 130, one or more aspects of the external system(s) 140, and/or the like) may be implemented. Multiple such computer systems 700 may be used in various implementations of the present disclosure. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The main memory 706 may, for example, include instructions to implement server instances, queuing modules, memory queues, storage queues, user interfaces, and/or other aspects of functionality of the present disclosure, according to various implementations.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), and/or the like, is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one implementation, the techniques herein are performed by computer system 700 in response to processor(s) 704 executing one or more sequences of one or more computer-readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

VIII. Example Clauses

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computer-implemented method for securing output from one or more nondeterministic models, the computer-implemented method comprising, by one or more hardware processors executing program instructions: receiving, from a user and via one or more graphical user interfaces, one or more user inputs including at least: a first user input providing at least a portion of a first prompt for a query for a first nondeterministic model; and in response to receiving the one or more user inputs: executing the query, by the first nondeterministic model, to generate an output; determining a first one or more data inputs used by the first nondeterministic model during execution of the query; determining a first set of permissions associated with the first one or more data inputs; and applying a second set of permissions to at least a first portion of the output based on the first set of permissions.

Clause 2. The computer-implemented method of Clause 1, wherein determining the first one or more data inputs comprises: determining one or more access credentials associated with the user; and determining at least a first data input of the first one or more data inputs based at least in part on the one or more access credentials.

Clause 3. The computer-implemented method of Clause 2, wherein determining the first one or more data inputs further comprises: receiving, from the first nondeterministic model, a request to access at least a third data input of the first one or more data inputs based on at least one of: the first prompt for the query, or the one or more access credentials.

Clause 4. The computer-implemented method of any of Clauses 1-3, wherein the first one or more data inputs are determined, at least in part, by the first nondeterministic model.

Clause 5. The computer-implemented method of any of Clauses 1-4, wherein determining the first one or more data inputs further comprises: determining at least a second data input of the first one or more data inputs based at least in part on the first prompt for the query.

Clause 6. The computer-implemented method of any of Clauses 1-5 further comprising, by the one or more hardware processors executing program instructions: receiving, from the user and via the one or more graphical user interfaces, a second one or more user inputs including at least: a second user input providing a second prompt for a second query for the first nondeterministic model, wherein the second prompt is identical to, or similar to, the first prompt; and in response to receiving the second one or more user inputs: executing the second query, by the first nondeterministic model, to generate a second output; determining a second one or more data inputs used by the first nondeterministic model during execution of the second query, wherein the second one or more data inputs are different than the first one or more data inputs; determining a third set of permissions associated with the second one or more data inputs; and applying a third set of permissions to at least a first portion of the second output based on the first set of permissions.

Clause 7. The computer-implemented method of any of Clauses 1-6, wherein the first one or more data inputs is a reduced set of data inputs compared to a total set of data inputs accessible by the user.

Clause 8. The computer-implemented method of Clause 1 further comprising, by the one or more hardware processors executing program instructions: determining, during execution of the query, whether a second nondeterministic model accessed the first portion; in response to determining that the second nondeterministic model accessed the first portion, propagating the second set of permissions to at least a second portion of the output of the second nondeterministic model.

Clause 9. The computer-implemented method of Clause 8, wherein the second nondeterministic model is the first nondeterministic model.

Clause 10. The computer-implemented method of any of Clauses 1-9, wherein the first nondeterministic model is a language model.

Clause 11. The computer-implemented method of any of Clauses 1-10, wherein the first nondeterministic model is a large language model.

Clause 12. The computer-implemented method of any of Clauses 1-11, wherein determining the first set of permissions comprises: causing at least the first set of permissions to display on the one or more graphical user interfaces; receiving, from the user and via the one or more graphical user interfaces, a third one or more user inputs comprising at least a confirmation input for the first set of permissions; and in response to receiving the confirmation input, determining whether to remove at least a subset of the first set of permissions.

Clause 13. The computer-implemented method of Clause 12 further comprising, by the one or more hardware processors executing program instructions: in response to determining to remove at least the subset of the first set of permissions, removing at least the subset of the first set of permissions.

Clause 14. The computer-implemented method of any of Clauses 1-13 further comprising, by the one or more hardware processors executing program instructions: causing display, in one or more graphical user interfaces, at least one of: the first set of permissions, or the second set of permissions; receiving, from the user and via the one or more graphical user interfaces, a confirmation and/or change to the second set of permissions to be applied to the at least the first portion of the output.

Clause 15. The computer-implemented method of any of Clauses 1-14, wherein: the first one or more data inputs comprises at least a first data input and a second data input, the first data input requiring a first permission to access and the second data input requiring a second permission to access, the first set of permissions comprises at least the first permission and the second permission; and the second set of permissions comprises at least one of the first permission or the second permission.

Clause 16. The computer-implemented method of any of Clauses 1-15 further comprising, by the one or more hardware processors executing program instructions: determining the output of the first nondeterministic model is accessed without a required access credential for the second set of permissions; and redacting at least the first portion.

Clause 17. The computer-implemented method of any of Clauses 1-16, wherein the second set of permissions are at least one of: a propagation of the first set of permissions from the first one or more data inputs to the at least the first portion of the output, a subset of the first set of permissions, or a reduced set of permissions as compared to the first set of permissions.

Clause 18. The computer-implemented method of any of Clauses 1-17 further comprising, by the one or more hardware processors executing program instructions: determining the second set of permissions, wherein the second set of permissions is determined based at least in part on at least one of: the first set of permissions, access credentials associated with the first nondeterministic model, access credentials associated with the user, one or more user inputs, and/or any combination of the foregoing.

Clause 19. A system comprising: one or more computer-readable storage mediums having program instructions embodied therewith; and one or more processors configured to execute the program instructions to cause the system to perform the computer-implemented method of any of Clauses 1-18.

Clause 20. A computer program product comprising one or more computer-readable storage mediums having program instructions embodied therewith, the program instructions executable by one or more processors to cause the one or more processors to perform the computer-implemented method of any of Clauses 1-18.

What is claimed is:

1. A computer-implemented method for securing output from one or more nondeterministic models, the computer-implemented method comprising, by one or more hardware processors executing program instructions:

receiving, from a user and via one or more graphical user interfaces, one or more user inputs including at least:
  - a first user input providing at least a portion of a first prompt for a query for a first nondeterministic model; and in response to receiving the one or more user inputs:
  - executing the query, by the first nondeterministic model, to generate an output;
  - determining a plurality of data inputs used, or to be used, by the first nondeterministic model during execution of the query, wherein the plurality of data inputs includes at least a first data input and a second data input;
  - determining at least a first permission associated with the first data input and at least a second permission associated with the second data input;
  - determining, based at least on the first permission and the second permission, a third permission to be applied to the output; and
  - applying the third permission to the output generated by the first nondeterministic model, whereby one or more permissions are propagated from the plurality of data inputs to the output generated by the first nondeterministic model.

2. The computer-implemented method of claim 1, wherein:

the first data input of the plurality of data inputs requires the first permission to access, and the second data input of the plurality of data inputs requires the second permission to access.

3. The computer-implemented method of claim 1, wherein the third permission is at least one of:

a propagation of the first permission and the second permission from the plurality of data inputs to the output, a subset of the first permission and the second permission, a reduced set of permissions as compared to the first permission and the second permission, a same permission as the first permission, or a same permission as the second permission.

4. The computer-implemented method of claim 1, further comprising:

determining one or more access credentials associated with the user; and granting a first nondeterministic model access to the plurality of data inputs based at least in part on the one or more access credentials.

5. The computer-implemented method of claim 4, further comprising:

receiving, from the first nondeterministic model, a request to access at least a third data input of the plurality of data inputs based on at least one of: the first prompt for the query, or the one or more access credentials.

6. The computer-implemented method of claim 1, wherein the plurality of data inputs are determined, at least in part, by the first nondeterministic model during execution of the query.

7. The computer-implemented method of claim 1, wherein determining the plurality of data inputs further comprises:

determining the second data input of the plurality of data inputs based at least in part on the first prompt for the query.

8. The computer-implemented method of claim 1 further comprising, by the one or more hardware processors executing program instructions:

receiving, from the user and via the one or more graphical user interfaces, a second one or more user inputs including at least:

a second user input providing a second prompt for a second query for the first nondeterministic model, wherein the second prompt is identical to, or similar to, the first prompt; and in response to receiving the second one or more user inputs:

executing the second query, by the first nondeterministic model, to generate a second output;

determining a third data input used, or to be used, by the first nondeterministic model during execution of the second query, wherein the third data input is different from the first data input and the second data input;

determining a third set of permissions fourth permission associated with the third data input-second one or more data inputs;

determining, based at least on the fourth permission, a fifth permission to be applied to the second output; and applying the fifth permission to at least a first portion of the second output.

9. The computer-implemented method of claim 1, wherein the plurality of data inputs is a reduced set of data inputs compared to a total set of data inputs accessible by the user.

10. The computer-implemented method of claim 1 further comprising, by the one or more hardware processors executing program instructions:

determining, during execution of the query, whether a second nondeterministic model accessed a first portion of the output; and in response to determining that the second nondeterministic model accessed the first portion of the output, propagating the third permission to at least a second portion of the output of the second nondeterministic model.

11. The computer-implemented method of claim 10, wherein the second nondeterministic model is the first nondeterministic model.

12. The computer-implemented method of claim 1, wherein the first nondeterministic model is a language model.

13. The computer-implemented method of claim 1, wherein the first nondeterministic model is a large language model.

14. The computer-implemented method of claim 1, wherein determining the first permission and the second permission comprises:

causing at least the first permission and the second permission to display on the one or more graphical user interfaces;

receiving, from the user and via the one or more graphical user interfaces, a third one or more user inputs comprising at least a confirmation input for the first permission and the second permission; and in response to receiving the confirmation input, determining whether to remove at least a subset of the first permission and the second permission.

15. The computer-implemented method of claim 14 further comprising, by the one or more hardware processors executing program instructions:

in response to determining to remove at least the subset of the first permission and the second permission, removing at least the subset of the first permission and the second permission.

16. The computer-implemented method of claim 1 further comprising, by the one or more hardware processors executing program instructions:

causing display, in one or more graphical user interfaces, at least one of: the first permission, the second permission, or the third permission; and receiving, from the user and via the one or more graphical user interfaces, a confirmation and/or change to the third permission to be applied to the output.

17. The computer-implemented method of claim 1 further comprising, by the one or more hardware processors executing program instructions:

determining the output of the first nondeterministic model is accessed without a required access credential for the third permission; and redacting at least a first portion of the output.

18. The computer-implemented method of claim 1 further comprising, by the one or more hardware processors executing program instructions:

determining the third permission, wherein the third permission is determined based at least in part on at least one of: the first permission, the second permission, access credentials associated with the first nondeterministic model, access credentials associated with the user, one or more user inputs, and/or any combination of the foregoing.

19. A system comprising:

one or more computer-readable storage mediums having program instructions embodied therewith; and one or more processors configured to execute the program instructions to cause the system to perform the computer-implemented method of claim 1.

20. A computer program product comprising one or more computer-readable storage mediums having program instructions embodied therewith, the program instructions executable by one or more processors to cause the one or more processors to perform the computer-implemented method of claim 1.

* * * * *